(12) United States Patent
Miele et al.

(10) Patent No.: US 7,201,788 B2
(45) Date of Patent: Apr. 10, 2007

(54) PROCESS FOR THE PRODUCTION OF A BORON SALT AND ITS USE IN THE AGRONOMIC FIELD

(75) Inventors: Sergio Miele, Larderello (IT); Enrica Bargiacchi, Larderello (IT); Giuseppe Giorgis, Larderello (IT); Paolo Bonini, Larderello (IT)

(73) Assignee: Societa Chimica Larderello S.p.A., Larderello, Pisa (IT)

( * ) Notice: Subject to any disclaimer, the term of this patent is extended or adjusted under 35 U.S.C. 154(b) by 422 days.

(21) Appl. No.: 10/274,595

(22) Filed: Oct. 21, 2002

(65) Prior Publication Data
US 2003/0131642 A1 Jul. 17, 2003

(30) Foreign Application Priority Data
Oct. 29, 2001 (IT) ............... MI2001A2269

(51) Int. Cl.
*C05D 9/00* (2006.01)
(52) U.S. Cl. .................. 71/31; 71/61
(58) Field of Classification Search ........... 71/31, 71/61
See application file for complete search history.

(56) References Cited

U.S. PATENT DOCUMENTS

| | | | | |
|---|---|---|---|---|
| 2,950,182 A | * | 8/1960 | Emmert ................ 504/122 |
| 3,361,684 A | * | 1/1968 | Chvatal ................ 252/478 |
| 4,089,790 A | | 5/1978 | Adams ................. 508/156 |
| 4,163,729 A | * | 8/1979 | Adams ................. 508/156 |
| 4,192,664 A | * | 3/1980 | Joshi .................. 65/22 |
| 5,256,515 A | * | 10/1993 | Law et al. ............. 430/108.3 |
| 5,304,656 A | * | 4/1994 | Yano et al. ............ 549/1 |
| 5,827,633 A | * | 10/1998 | Ong et al. ............. 430/137.14 |
| 5,958,463 A | * | 9/1999 | Milne et al. ........... 424/660 |
| 6,448,461 B1 | * | 9/2002 | Toyohara et al. ........ 588/12 |

FOREIGN PATENT DOCUMENTS

| | | |
|---|---|---|
| EP | 0 937 557 | 8/1999 |
| JP | 05158185 | * 6/1993 |
| SU | 1 608 116 | 11/1990 |
| WO | WO 99 09832 | 3/1999 |

OTHER PUBLICATIONS

Essential Plant Nutrients from Nutrient Management for south Carolina, Clemson Univ., Mar. 2001, http://soils.clemson.edu/elements.htm.*
Sciencepages.co.uk downloaded from www.sciencepages.co.uk/keystage4/GCSEChemistry/mod3questions.php, downloaded on Jun. 21, 2005.*
Environmental Literacy Council, downloaded on Jun. 22, 2005 from www.enviroliteracy.org/article.php/1019.php.*
"Nutrient Content of Fertilizer Materials", Mitchell, Auburn University, Oct. 1999, downloaded from http//: www.aces.edu/pubs/doc/A/ANR-0174.*

* cited by examiner

*Primary Examiner*—C. Sayala
(74) *Attorney, Agent, or Firm*—Hedman & Costigan P.C.; James V. Costigan

(57) ABSTRACT

The present invention relates to a process for the production of potassium octoborate hydrate which comprises the dissolution of boric acid and caustic potash in an aqueous solution brought to a temperature of 95° C., the drying of the product obtained and its grinding into an amorphous powder. Potassium octoborate and its polyhydrate forms obtained are specifically suitable for use in the agronomic field.

16 Claims, 1 Drawing Sheet

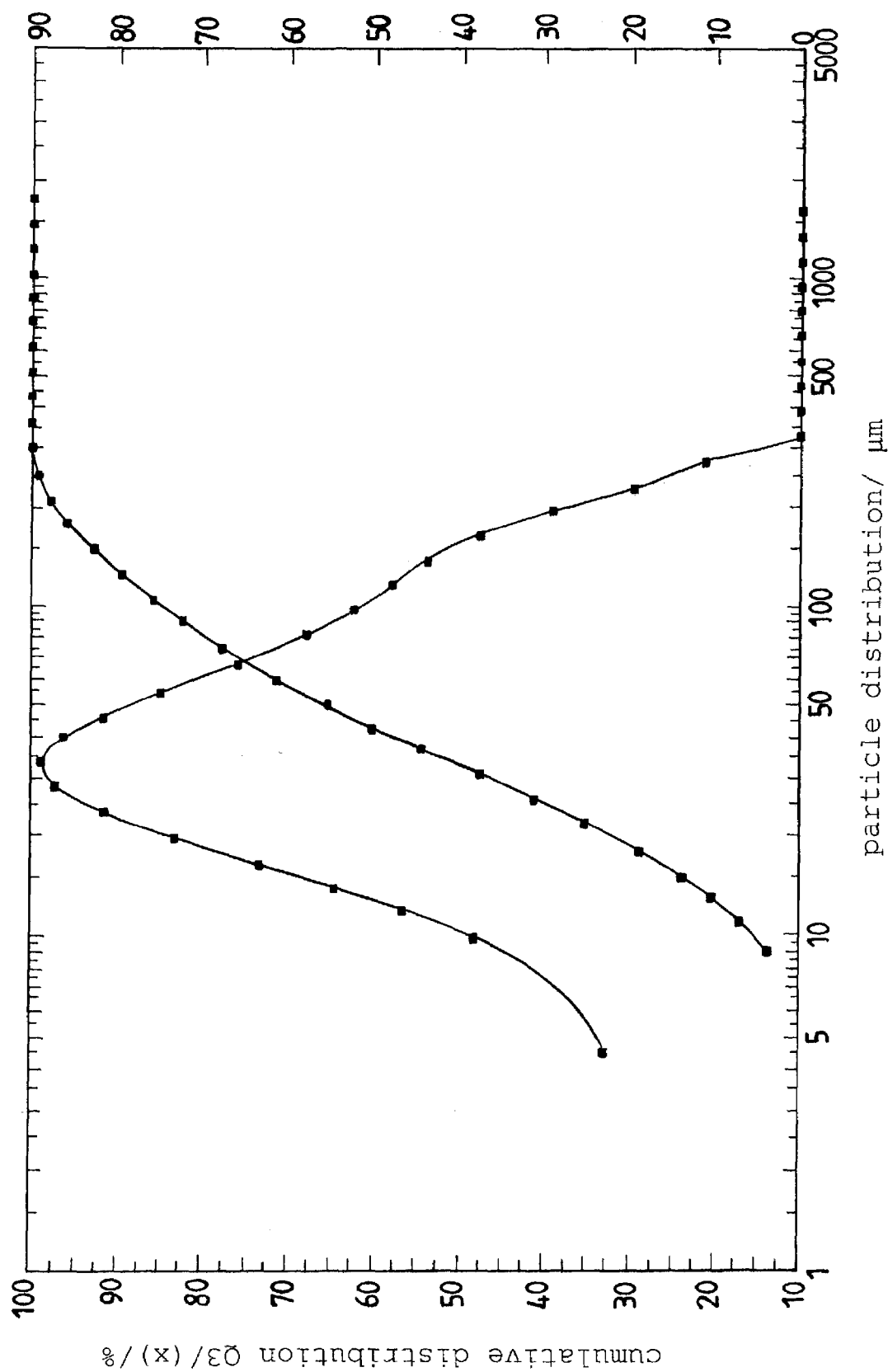

PROCESS FOR THE PRODUCTION OF A BORON SALT AND ITS USE IN THE AGRONOMIC FIELD

The present invention relates to a process for the production of a boron salt and its use in the agricultural field.

In particular, the present invention relates to a potassium polyborate, similar to a potassium tetrahydrate octoborate, the relative preparation process and its use as an agricultural fertilizer.

Thanks to its intrinsic properties, boric acid has found various applications both in the agricultural field as a fertilizer and biocide and in the industrial sector as a wood preserver and flame-retarding agent.

As is known, boric acid can be prepared by the acidification of easily available sodium salts, such as sodium tetraborate pentahydrate and sodium tetraborate decahydrate.

For example, sodium tetraborate and sulfuric acid are reacted in aqueous suspension to give sodium perborate, a compound which, like boric acid, is applied in various fields.

In particular, in the agronomic field borates are widely used as fertilizers as boron is a micro-element whose presence, in reduced quantities, is essential for an adequate nutrition of plants.

It is known in fact that boron acts as a regulating element of the carbohydrate metabolism in vegetables. For example, the positive action is known, on sugar beet plants in terms of the yield to crystallizable sucrose [in Loué A., 1994, Oligoélements en Agriculture. SCPA Nathan pages 578].

Its scarcity in the soil causes a degeneration of the meristematic tissues with a reduced plant development, deformation in the structure of the fruit and leaves, dryness of the shoots.

Another positive effect of boron also relates to the pollination of flowers, to favour the increase of fructification. For this purpose, on many cultivations such as apples, olives and vines, boron is typically applied through the leaves before flowering, even if the traditional formulations available for this purpose are not entirely safe due to the contemporaneous presence, in the boron-based compound, of toxic elements with respect to the young floral tissues, such as sodium and ammonium.

It is known on the other hand that an excessive presence of boron in the ground can be equally harmful to the same extent as a lack of the micro-element.

The use of fertilizing products which incorporate boron is therefore a consolidated procedure, above all for the treatment of sandy or calcareous earth with high pH values or also land irrigated by drip systems, in which the possibilities of developing a scarcity of this element are higher.

Polyborates or compositions based on boron and its salts appropriately formulated for being used in the agricultural field, have therefore been developed over the years.

Most of the preparations based on boron of the known type, for agricultural use are not without their drawbacks, which can mainly be attributed to a reduced solubility in water and to a limited capacity of passing through the membranes of plants, in particular for products in which boron is associated with calcium or other earth-alkaline cations. In addition to this, as mentioned above, there is the risk of phytotoxicity on the part of the cultivations when the traditional products, carrying for example boron associated with elements such as sodium, are distributed via the leaves. In this case, in fact, in addition to the normal risk level for the direct toxicity of boron, there is also phytotoxicity due to the sodium salinity of the compound used.

Among boron-based compounds for agricultural use, sodium octoborate plays an important role due to its wide diffusion and practicality of use.

This compound is a boron salt commonly sold in the form of dry powder whose use in agriculture can vary according to several applicative procedures.

In particular, sodium octoborate tetrahydrate in powder form is applied directly to the soil or leaves, usually mixed with other fertilizers as the suggested dosage per surface unit is so low as to recommend its incorporation in a suitable matrix.

Owing to the difficulties which can arise in obtaining a uniform dispersion of this active principle in the matrix and as there are problems of segregation after mixing, resort is often made to the use of solutions of sodium octoborate tetrahydrate in manure or phyto-protective mixtures distributed in the liquid state.

The reduced solubility observed in the preparation of extemporaneous solutions of sodium octoborate tetrahydrate is mainly caused by an inadequate mixing in water, in some cases heightened by the presence of further substances not highly soluble, which must be dissolved before application to the soil.

In order to improve the solubility and therefore the phyto-availability of boron salts, formulations with an increased solubility have therefore been produced. Another evolution of boron-based compounds consists of preparations which include polyborates associated with surface-active agents or dissolving agents or with other additives such as alkanolamines and aliphatic polyamines.

The use of these compositions however has its disadvantages mainly attributable to the difficulty in correctly dosing the final quantity of boron to be applied per surface unit.

In particular, some of the most recent production techniques of polyborates comprise the reaction of a compound of boric acid with one or more cyclic amines in aqueous solution.

The resulting product however has solubility and phyto-availability characteristics which are not entirely satisfactory.

The demand is currently felt for having new polyborates in a form substantially free from sodium ion and with a sufficient solubility for allowing easy application in the agronomic field.

One of the main objectives of the present invention therefore consists in providing a process for producing a polyborate which is both easy to prepare and which does not involve high production costs.

Another objective of the invention consists in producing a polyborate which has good solubility characteristics in water together with phyto-availability properties which are such as to make it appropriate for applications in the agronomic field and specifically for those effected through the leaves.

A further objective of the present invention consists in providing a process for producing an octoborate substantially without sodium and therefore particularly suitable for use in the agricultural industry.

In view of these objectives and others which will appear evident hereunder, in accordance with a first aspect of the present invention, a boron-based compound is provided, in particular in salified form, in which said compound is similar to a potassium octoborate in particular in the tetrahydrate form.

BRIEF DESCRIPTION OF THE DRAWING

The FIGURE represents the particle size distribution trend of a potassium octoborate tetrahydrate product. Two granulometric curves are shown, indicating the data of the various granulometric functions in two ways: the distribution density and cumulative distribution.

DETAILED DESCRIPTION

According to another aspect of the invention, a process is provided for the production of potassium octoborate tetrahydrate comprising the dissolution and reaction of boric acid and caustic potash in aqueous solution and the drying of the product obtained from the reaction.

Within the context of the process of the invention, the caustic potash used is an aqueous solution of potassium hydroxide which conveniently has a concentration higher than 25% by weight of KOH and preferably a concentration of KOH ranging from 45–50% by weight.

During the initial dissolution phase of the process, in order to optimize the dissolution of the reagents, the aqueous solution is conveniently heated to a temperature at which the reagent species are substantially completely dissolved.

In particular, it has been observed that an optimum dissolution of the reagents is obtained with temperature values ranging from 92 to 98° C. and in particular close to 95° C.

The reagents of the process, consisting of boric acid and caustic potash are conveniently supplied in a high purity form.

Following the dissolution and reaction phase, the solution containing the reaction product is subjected to drying which is conveniently effected by means of a drying plant of the spray dryer type which atomizes the solution coming from inside a drying chamber.

According to an embodiment, a stream of hot air, obtained by heating external air first with an endogenous vapour unit heater, then with a Lpg burner, dehydrates the drops of solution and sends the product obtained towards a process/product air separation cyclone.

The product obtained is then preferably subjected to grinding in order to reduce the particle size and increase its specific weight.

According to an embodiment, during the drying phase of the process, the product is partly conveyed towards a cyclone and partly towards the bottom of the spray dryer. The product is then conveniently sent from both sections, by means of two rotocells, into the pneumatic transport line towards a second separator cyclone and subsequently to a grinding mill which reduces its particle size and increases the apparent specific weight of the product. The product leaving the mill is collected in the storage silos which feeds a packaging line.

The air streams leaving the spray dryer and pneumatic transport line, containing small quantities of product in powder form, are advantageously transferred through ventilators to the wet separator. The solution, used for washing the streams of air, is recovered in the tank/dissolver for the preparation of a new batch.

During the dissolution phase, it is convenient to monitor the main process parameters, consisting of the titer of the solution expressed in grams/litre of $H_3BO_3$ and $K_2O$.

The evaluation of the titer of the solution is preferably effected each time the batch is prepared, by means of a titration which, for example, comprises removing 50 ml of solution to be tested with a graduated pipette, transferring to a 500 ml calibrated flask, washing the pipette with water. Water is then added to regulate the volume and stirring is effected to obtain a first solution.

For the determination of $K_2O$, 20 ml of this first solution are removed and transferred to a beaker in which about 100 ml of water are added together with 2–3 drops of methyl orange. Titration is then effected with HCl until the indicator changes colour.

For the determination of $B_2O_3$, a few drops of phenolphthalein and a spoonful of mannite (about 8 g) or neutral sorbitol are added to the previously titrated solution. The titration is then effected with NaOH 1 N until the indicator changes colour.

The dissolution phase is preferably controlled and specified on operating sheets every hour.

It has been verified that during the drying phase of the process, it is convenient to monitor some of the process parameters and in particular:

the feeding flow-rate of the solution. A suitable value ranges from 1100 to 1500 l/h, the optimum value is equal to about 1300 l/h;

air flow-rate in the feeding to the chamber, conveniently within the range of 7000 to 8000 $m^3/h$ and preferably equal to 7500 $m^3/h$;

temperature of the air fed to the chamber, conveniently ranging from 400 to 470° C., preferably established at about 435° C.;

temperature at the outlet of the spray dryer, with an optimum value of 141° C.;

depression value inside the chamber, with an optimum value equal to 7 mmca.

In the storage phase of the process of the invention, the apparent specific weight of the potassium octoborate tetrahydrate product can conveniently vary from 0.45 to 0.75 $kg/dm^3$ whereas the titer of $B_2O_3$ is, for example, not less than 61% which corresponds to about 19% of Boron.

The apparent specific weight of the product based on potassium octoborate tetrahydrate is an indicative parameter and within the scope of the present invention can be evaluated according to the following method:

a graduated cylinder, for example 250 cc made of PVC, is placed on a centesimal balance and set to zero. The graduated cylinder is filled with the product up to about 250 cc of volume and weighed (net weight). The cylinder is uniformly knocked, for example about 20 times, trying to keep the cylinder perpendicular to the striking surface and contemporaneously enclosing the cylinder in the palm of the hand to prevent the product from spilling. The product is levelled and the volume read. The apparent specific weight is thus obtained from the ratio between the net weight and volume.

The titer of $B_2O_3$ of the product obtained with the process of the invention is conveniently evaluated with the titration described above.

In the separation phase of the process of the invention, a wet separator is conveniently used and the flowrate of the solution to be re-treated, which is fed to the dissolver, is monitored as main parameter. The optimum flow-rate value is about 600 l/h.

The characteristics of a potassium octoborate tetrahydrate product prepared according to an embodiment of the present invention will appear more evident from the following description of an embodiment provided for purely illustrative purposes without limiting the protective scope and referring to the enclosed drawings wherein:

the enclosed figure represents the particle size distribution trend of a potassium octoborate tetrahydrate product.

With reference to the enclosed figure, two granulometric curves are shown, indicating the data of the various granulometric functions in two ways: the distribution density and cumulative distribution.

The particle-size of the product analyzed was effected by means of laser diffraction.

The percentage given is expressed in % volume and the bottom scale is of the logarithmic type in conformance with DIN 66141.

The cumulative distribution represents the average value of all the values registered during the analysis time for each single group, subsequently added up in sequence.

For example, in the curve the percentage of product which passes at 50 μm corresponds to about 65%. In the same way, it can be observed that the whole product is included below 325 μm or that about 13% of the product passes at 9 μm.

The density distribution represents the derivative of the data obtained and is suitable for illustrating the way in which the granulometric population is visually distributed.

According to a preferred embodiment, the process of the invention comprises the following sequence:

- dissolution of boric acid in an aqueous solution of caustic potash at a temperature at which the chemical species present are completely dissolved and allow a reaction with a high yield,
- drying of the solution prepared in the previous phase to obtain a product based on potassium octoborate tetrahydrate,
- a grinding phase to reduce the particle size of the product obtained and consequently produce a potassium octoborate tetrahydrate powder with a greater apparent specific weight,
- storage of the product in silos which feed a packaging line of the product.

According to another aspect of the present invention, the use of potassium octoborate tetrahydrate is provided in the agronomic field, in particular as fertilizer to optimize the metabolism of plants/seedlings.

According to another aspect of the present invention a fertilizing composition is provided, comprising an agronomically effective quantity of potassium octoborate tetrahydrate associated with an agronomically acceptable carrier.

The composition based on potassium octoborate tetrahydrate can be applied, in solid form or as an aqueous solution, directly to the plants, for example by spraying or fert-irrigation of the soil.

The following examples are provided for illustrative purposes only of the present invention and should in no way be considered as limiting the scope of the present invention which is defined by the enclosed claims.

EXAMPLE 1

The batch is prepared by feeding a dissolver with 7000 litres of water and bringing it to a temperature of about 95° C. 1300 litres of a solution at 48% of potash are subsequently added, followed by 4000 kg of boric acid until the final solution is obtained with a titer of $K_2O$ of 60 g/l and a titer of $H_3BO_3$ of 320 g/l and a ratio between $H_3BO_3$ and $K_2O$ equal to 5.3.

The reagents are then fed to the dissolver within a maximum time range of two hours and the addition is effected so that the temperature is never lower than 95° C.

When the batch is ready, the solution is fed to a drying plant of the spray dryer type with a flow-rate of 1300 l/h and a temperature of 95° C. The atomized solution is put in contact with 7500 m³/h of air at 435° C.

The stream of air at the outlet of the spray dryer has a temperature of about 140° C.

Every two hours the titer of the solution being fed to the spray dryer is controlled and 100–200 l/h of water are added to prevent the formation of concentration phenomena which would alter the titer.

Downstream of the spray dryer the potassium octoborate tetrahydrate obtained is ground and subsequently stored in silos.

The hourly production of the production plant under regime conditions is about 350 kg/h of dried product.

EXAMPLE 2

A product similar to potassium octoborate in the form of a white amorphous powder, produced with the process of Example 1 is collected and subjected to chemical analysis with the following results:

| Characteristic | Measurement unit | Value |
| --- | --- | --- |
| $B_2O_3$ | weight % | 61.0–64.85 |
| $K_2O$ | weight % | 20.0–21.4 |
| cryst. $H_2O$ | weight % | 19.0–13.75 |
| $B_2O_3/K_2O$ ratio | | 3.05–3.03 |
| Apparent density | Kg/dm³ | 0.5–0.7 |
| Particle size | weight % | as per FIG. 1 |
| pH (Aqueous. sol. 25° C.) | | 8.65 (1% conc. sol.) |
| | | 8.49 (2% conc. sol.) |
| | | 8.17 (5% conc. sol.) |
| Solub. in $H_2O$ (33° C.) | g prod./l. solut. | ~61 |

EXAMPLE 3

The product, according to Example 2, was used as a comparison with traditional sodium octoborate, in a boric manure test of sugar beet (random block with 4 replications), effected under the control of the Agronomy Department and Agro-ecosystem Management of the University of Pisa at the experimental Centre of the Region of Tuscany. The items compared are the following:

1) non-treated Blank;
2) 5 kg/ha of sodium octoborate distributed in a single treatment onto the soil after the sowing of beet.
3) 2.5+2.5 kg/ha of sodium octoborate distributed in two treatments through the leaves at the phases of 8 and 16 beet leaves.
4) 2.5+2.5 kg/ha of the product of EXAMPLE 2 distributed in two treatments through the leaves at the phases of 8 and 16 beet leaves.
5) 2.5+2.5 kg/ha of sodium octoborate distributed in a treatment to the soil, immediately after the sowing of beet, and a treatment through the leaves at the phase of 16 leaves of the same beet.
6) 2.5+2.5 kg/ha of the product of EXAMPLE 2 distributed in a treatment to the soil, immediately after the sowing of beet, and a treatment through the leaves at the phase of 16 leaves of the same beet.

The effect of the treatment was followed by determining the percentage content of boron in the vegetable tissues of the leaves (YMB=Young Mature Blade) at the phases of 12 and 24 leaves of the cultivation and registering the main productive parameters (root yield, polarimetric degree, sucrose production, content of alpha-aminic nitrogen, potassium and sodium in the extraction juices, elements which reduce the crystallization of sugar and consequently the industrial yield) and Dense Juice Purity [which is calculated with the empirical formula PSD=99.36−0.1427 (K+Na+alphaN) 100/Polarization]. The results are indicated in the following Table.

| | B mg/kg s.s. YMB | | ROOTS | SUCROSE | | ALPHA N | K | Na | PSD |
|---|---|---|---|---|---|---|---|---|---|
| | 12 L | 24 L | t/ha | °P | t/ha | meq/100 g | | | |
| Blank | 10 | 9 | 51.1 | 14.8 | 7.5 | 2.86 | 4.68 | 2.69 | 89.46 |
| Treat. 2 | 16 | 15 | 54.7 | 16.8 | 9.2 | 2.39 | 3.45 | 2.19 | 92.54 |
| Treat. 3 | 13 | 15 | 54.0 | 16.7 | 9.0 | 2.37 | 3.64 | 2.40 | 92.19 |
| Treat. 4 | 15 | 16 | 56.4 | 16.6 | 9.4 | 2.21 | 3.81 | 2.15 | 92.34 |
| Treat. 5 | 16 | 15 | 52.9 | 16.4 | 8.7 | 2.48 | 3.65 | 2.36 | 91.97 |
| Treat. 6 | 17 | 17 | 54.8 | 16.8 | 9.2 | 2.34 | 3.84 | 2.18 | 92.25 |
| DEV. ST | 2.8 | 3.0 | 3.4 | 1.0 | 0.8 | 0.25 | 0.57 | 0.22 | 1.16 |
| LSDP 0.05 | 1.1 | 1.2 | 1.4 | 0.4 | 0.3 | 0.10 | 0.23 | 0.09 | 0.46 |
| LSDP 0.01 | 1.5 | 1.6 | 1.8 | 0.5 | 0.4 | 0.13 | 0.30 | 0.11 | 0.61 |

From what is indicated above, it can be deduced that in the applications effected through the leaves (treatment 4 and 6) the product of EXAMPLE 2 gives a concentration of boron equal to or significantly higher than sodium octoborate. The root yield and the production per hectare of sucrose are higher with the product of EXAMPLE 2 with respect to sodium octoborate with an equivalent procedure (compare treat. 3–4 and 5–6), but are not different compared with the sodium octoborate distributed onto the soil (compare treat. 2–4 and 2–6). The treatments which comprise application through the leaves of sodium octoborate negatively influence the sodium content of the root, but there are no definite negative effects on the part of PSD. In short, for applications through the leaves, the product of EXAMPLE 2 has better characteristics than the reference standard, sodium octoborate, with the same applicative procedure.

EXAMPLE 4

Boron Fertilization—Field Experiment on Sugar Beet

Target of the Experiment

This research is aimed at investigating different Boron fertilization programs, based on a reference product (Sodium Octoborate=ONa) and a product according to the present invention: Potassium octoborate=OK The treatments were the following:

Control, unfertilized with Boron (0 kg/ha Boron);

Soil applied Boron at crop pre-emergence (2.5 kg/ha ONa) followed by a foliar application (2.5 kg/ha OK) at crop 16-leaf stage.

Foliar applied Boron (2.5 kg/ha OK at each treatment) at crop 8- and 16-leaf stages;

Foliar applied Boron (2.5 kg/ha ONa at each treatment) at crop 8- and 16-leaf stages.

Materials and Methods

This experiment was carried out at Cesa (AR) in the Farm Experiment Station of the Tuscainy's Agency for Agriculture Development (ARSIA). Crop was Sugar beet cv "Riace". Crop was planted on the row cm (crop density: 10 plants $m^{-2}$).

A 4—on Mar. 12, 2002, with an interrow of 45-cm and 22.2 cm-spacement replicated randomized experimental block design was used, with 9.45 $m^2$ (1.35×7,00 m) plots.

Preceding crop, soil tillage and fertilization, and crop protection treatments are indicated in Table 2002-1:

TABLE 2002-1

| Cropping conditions | | | |
|---|---|---|---|
| | | Rate | Date |
| Preceding crop | Wheat | | |
| Soil tillage | Ripping | | Jul. 23, 2001 |
| | Plowing | | Oct. 19, 2001 |
| | Disking | | Dec. 6, 2001 |
| | Rotative tillage | | Feb. 13, 2002 |
| Pre-plant fertilization | Triple Super phosphate | Ql/ha 2.20 | Feb. 13, 2002 |
| | Potassium Sulphate | Ql/ha 2.00 | |
| | Urea | Ql/ha 1.75 | |
| Pre-emerg. Treat. | See Treatment | | Mar. 22, 2002 |
| Crop 8-leaf treatm. | Scheme | | Apr. 30, 2002 |
| Crop 16-leaf treatm. | | | May 22, 2002 |
| Sidedress fertilization | Ca-Ammonium Nitrate | Kg/ha 150 | May 2, 2002 |
| Weed Control | Pyramin DF | Kg/ha 2,000 | Mar. 13, 2002 |
| | Goltix | Kg/ha 2,000 | |
| | Dual Vegoil | L/ha 0.300 | |
| Soil insecticide at crop planting | Marshal | Kg/ha 12 | Mar. 12, 2002 |
| Crop emergence | | | Mar. 25, 2002 |
| Crop protectant treatm. | Karate DF | kg/hl 0.080 | Jun. 3, 2002 |
| | Spyrale | l/ha 0.700 | Jul. 9, 2002 |

At crop technological maturation stage, on Aug. 20, 2002, on an area of 5,1 $m^2$ (1.35×3.78 m, equal to 51 plants $m^{-2}$) the following parameters were determined:

Root yield

Leaf Canopy yield

Theoretical and effective polarization

Molasse concentration

Molasse element (alfa-amino Nitrogen, Na, K) concentrations

Juice Alkalinity coefficient

Juice purity

Results

The treatments consisting in soil applied Boron at crop pre-emergence (2.5 kg/ha ONa), followed by a foliar application (2.5 kg/ha OK) at crop 16-leaf stage, gave the highest root yield (69.3 t $ha^{-1}$), which is 7.5% more than the control (Tab. 2002-2).

TABLE 2002-2

Production parameters

| TREATMENTS | Root Yield | Foliar Canopy Yield t ha$^{-1}$ (Fresh Matter) | Total Biomass |
|---|---|---|---|
| Control | 64.5 b | 32.8 | 97.4 |
| ONa pre-emergence + OK (16 leaf) | 69.3 a | 36.4 | 105.7 |
| Foliar ONa (8 + 16-leaf) | 66.0 ab | 36.5 | 102.5 |
| Foliar OK (8 + 16-leaf) | 66.6 ab | 33.4 | 99.9 |

The experiment was characterized by very low technological characters of the roots, with field means, for polarization and PSD, of 11,85 and 88,11, resp. This behavior was related to the anomalous climatic conditions, which penalized uniformly all the treatments under study, giving origin to no significant differences among the observed characters (Tab. 2002-3).

TABLE 2002-3

Quality parameters

| TREAT-MENTS | Theor Pol. ° S | Eff Pol | PSD | K | Na meq/100 g polpa | N | CAk | Mol |
|---|---|---|---|---|---|---|---|---|
| Control | 12.03 | 9.81 | 88.38 | 3.04 | 3.3 | 2.89 | 2.2 | 2.22 |
| ONa pre-emerg. + OK (16 leaf) | 12 | 9.70 | 88.24 | 3.06 | 3.45 | 2.86 | 2.28 | 2.28 |
| Foliar/ONa (8 + 16-leaf) | 11.79 | 9.47 | 87.91 | 2.98 | 3.63 | 2.87 | 2.31 | 2.31 |
| Foliar/OK (8 + 16-leaf) | 11.88 | 9.55 | 88.20 | 3.01 | 3.65 | 2.65 | 2.6 | 2.33 |

For the above reason, theoretical and effective saccharose yields followed the same pattern of root yield (Tab. 2002-4).

TABLE 2002-4

Theoretical and effective saccharose yield

| TREATMENTS | Theoretical Saccharose t ha$^{-1}$ | Effective Saccharose |
|---|---|---|
| Control | 7.77 b | 6.34 b |
| ONa pre-emergence + OK (16 leaf) | 8.29 a | 6.71 a |
| Foliar ONa (8 + 16-leaf) | 7.78 b | 6.26 b |
| Foliar OK (8 + 16-leaf) | 7.89 ab | 6.33 b |

Discussion

A combined treatment of soil applied, crop pre-emergence, ONa, followed by foliar applied OK at crop 16-leaf stage, gave the highest sugar yield. Foliar applied OK showed a trend to a better yield than ONa, at the same rate and application mode.

CONCLUSIONS

An interaction between year and application mode, which is able to give the maximum saccharose yield, was observed over the years. However, OK, applied as a double foliar treatment or a foliar treatment in sequence to a crop pre-emergence soil application, permitted to cope successfully with the climate variability affecting product performance.

The invention claimed is:

1. A process for the production of potassium octoborate tetrahydrate consisting essentially of dissolving boric acid with caustic potash in aqueous solution and a drying phase of the product obtained from the reaction.

2. The process according to claim 1, the boric acid is dissolved in the aqueous caustic potash solution at a temperature at which the reacting chemical species are completely dissolved.

3. The process according to claim 2, wherein the temperature of said aqueous solution is within the range of 92–98° C.

4. The process according to claim 1, comprising the reaction of 320+/−10 g/l of $H_3BO_3$ with 60+/−10 g/l of $K_2O$.

5. The process according to claim 1, wherein said drying phase comprises a drying step carried out by atomization of said solution.

6. The process according to claim 1, characterized in that said drying phase takes place by means of a spray-dryer.

7. The process according to claim 6, characterized in that said spray-dryer is fed with a flow-rate of the solution ranging from 1200–1400 l/h.

8. The process according to claim 6, wherein the solution atomized by means of a spray dryer is in contact with a quantity of air ranging from 6500 to 8500 m$^3$/h of air.

9. The process according to claim 6, wherein the process air of said spray dryer has a temperature ranging from 400 to 470° C.

10. The process according to claim 6, characterized in that the stream of air at the outlet of said spray dryer has a temperature ranging from 130–150° C.

11. The process according to claim 1, further comprising a final grinding phase of the product obtained.

12. The process according to claim 1, further comprising a separation phase of the powders present in the process air, necessary for the drying phase.

13. A fertilizing composition comprising an agronomically effective quantity of potassium octoborate tetrahydrate in association with an agronomically acceptable carrier.

14. A fertilizing method comprising the application of an agronomically effective amount of potassium octoborate tetrahydrate to the soil or cultivation.

15. The method according to claim 14, comprising the application of a quantity of potassium octoborate tetrahydrate ranging from 1–10 kg per hectare of land.

16. A fertilizing method wherein an agronomically effective amount of potassium octoborate tetrahydrate is applied through the leaves of a plant.

\* \* \* \* \*